United States Patent [19]

Pegels et al.

[11] 4,357,304

[45] Nov. 2, 1982

[54] MOVING CATALYST BED REACTOR

[75] Inventors: Abraham A. Pegels; Matheus M. van Kessel, both of The Hague, Netherlands

[73] Assignee: Shell Oil Company, Houston, Tex.

[21] Appl. No.: 288,263

[22] Filed: Jul. 30, 1981

[30] Foreign Application Priority Data

Jul. 30, 1980 [GB] United Kingdom ................. 8024870

[51] Int. Cl.³ ............................. B01J 8/04; B01J 8/12; B01J 19/24
[52] U.S. Cl. ................................... 422/191; 422/194; 422/195; 422/216
[58] Field of Search ............... 422/191, 194, 195, 213, 422/216, 220, 311

[56] References Cited

U.S. PATENT DOCUMENTS

| | | | |
|---|---|---|---|
| 3,186,935 | 6/1965 | Vaell | 208/59 |
| 3,784,361 | 1/1974 | Kubec et al. | 422/194 |
| 3,883,312 | 5/1975 | Youngman | 422/213 |
| 3,966,420 | 6/1976 | Pegels et al. | 422/191 |
| 4,110,081 | 8/1978 | Millar et al. | 422/216 |
| 4,229,418 | 10/1980 | Wuffels et al. | 422/191 |
| 4,277,444 | 7/1981 | Van Landeghem | 422/191 |

Primary Examiner—Bradley Garris
Attorney, Agent, or Firm—Ronald R. Reper; John M. Duncan

[57] ABSTRACT

Moving bed reactor provided with conical catalyst bed supporting means, which are in communication with vertical channels below the cone(s) and provided with screen walls for the removal of reactor effluent, wherein for increasing the sieve area the channels are ring shaped, both walls having a screen area and/or are provided with intermediate double-walled partitions bearing screen sections in each wall.

10 Claims, 6 Drawing Figures

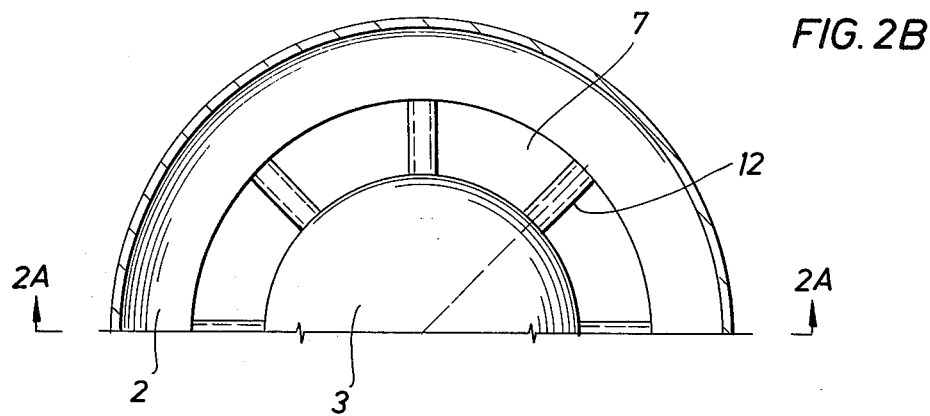
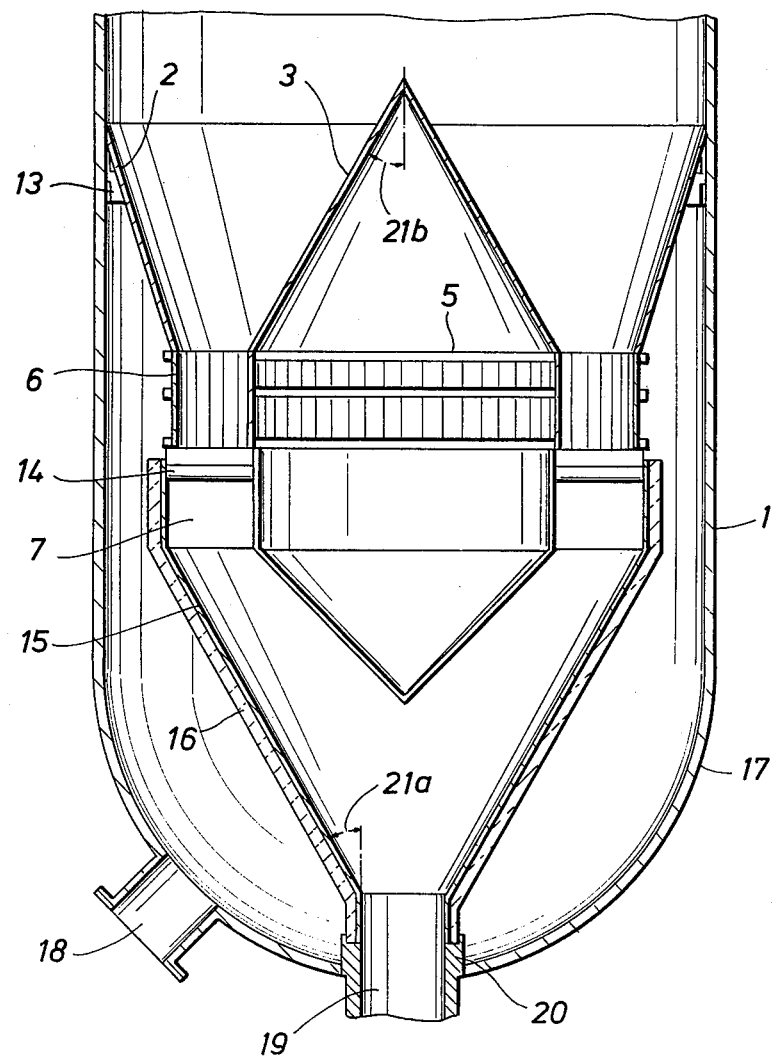
FIG. 2B
FIG. 2A

MOVING CATALYST BED REACTOR

BACKGROUND OF THE INVENTION

The present invention relates to a moving bed reactor, suitable for the catalytic treatment of hydrocarbons, such as catalytic desulphurization and demetallization of petroleum residues. The reactor is of the type which contains at least one tray as well as supporting means for one or more catalyst beds, means which are permeable to liquid and gas and impermeable to catalyst particles and in which said supporting means are attached to the wall of the reactor and are at least partly in the shape of a conical surface of a truncated cone.

More particularly, the invention relates to a moving catalyst bed reactor comprising a vertical cylindrical vessel having separate inlets for reactant and catalyst at the upper part of the vessel and catalyst bed supporting means in the shape of one or more downwardly converging conical surfaces the lower end thereof being connected to one or more vertical outlet channels having circumferential walls for the combined passage of catalyst and separation of reactor effluent, said circumferential walls being provided with a screen section for withdrawing the effluent from the catalyst, and separate outlet conduits for reactor effluent and catalyst downstream of said screen section.

Moving bed reactors of a design as identified above are known. Examples thereof have been described, e.g., in U.S. Pat. Nos. 3,883,312 and 3,966,420. According to the first U.S. specification both the used solid catalyst and the reactor effluent are removed from a moving bed reactor through the same withdrawal conduit. The reactor effluent exits the conduit through perforations in its wall. The catalyst descends past the perforations and is washed by an upward moving wash oil which leaves through the same perforations. An alternative solution for the separation of reactor effluent and catalyst and optionally wash fluid has been described in U.S. Pat. No. 3,966,420, the screen section being situated in the conical part of the supporting means and being of specific design consisting of bars of particular configuration and slit type sieve openings.

Both solutions have their advantages and disadvantages. Vertical screen surfaces have a rather small risk that catalyst fines may penetrate into the sieve openings, but usually have, owing to their construction, a smaller sieve area than a screen provided in conical supporting means.

More recently there is a tendency to carry out such processes on an ever increasing scale resulting in growing problems in the constructional design of the reactors when scaled up to such large capacities. One such problem is the circumstance that the catlyst bed area is growing therewith and that separation of reactor effluent from parts of the bed at distance from a screen area becomes more and more difficult.

An object of the present invention is to overcome such scaling-up difficulties. There is provided, according to the invention, a moving bed reactor of the type specified above, in which the vertical outlet channels are provided with further wall portions within said channels each bearing a screen section for withdrawal of reactor effluent from the catalyst.

The invention further resides in measures for the adequate design of the supporting surface with its associated screen section adapted to the requirements in scaling up reactors of the type concerned in which the following process and design conditions have to be taken into account.

As far as the flow of fluids and solids are concerned, the mass flow behavior of the solids should be maintained, while the spread in residence time should be kept as small as possible. Further the pressure drop over the catalyst bed supporting and passage internals is to be kept as low as possible and the liquid redistribution has to be possible over an optimal percentage of the reactor cross-sectional area. Screen loads have to be in the same order of magnitude throughout the reactor for reasons of preventing as much as possible fouling of the screens and pinning of the catalyst particles against the screens. And finally, forces and stresses on the reactor internals supporting and guiding the catalyst should be carefully calculated and checked.

SUMMARY OF THE INVENTION

According to the invention, there is provided a moving bed reactor apparatus through which solid catalyst particles forming a catalyst bed descend by the action of gravity, which apparatus comprises: (a) a vertically disposed cylindrical vessel, (b) a reactant inlet conduit communicating with an upper portion of said vessel, (c) a catalyst inlet conduit communicating with an upper portion of said vessel, (d) catalyst supporting means for at least one catalyst bed, said catalyst supporting means being disposed within said reactor below said catalyst inlet conduit, said catalyst supporting means being supported upon the inner wall of said reactor and being at least partly in the shape of the conical surface of at least one truncated cone converging downwardly to at least one vertical outlet channel, each said outlet channel having circumferential walls for the combined passage of catalyst and separation of reactor effluent, said circumferential walls having a screen section for withdrawing said reactor effluent from said catalyst; said outlet channel(s) having separate outlet conduits for reactor effluent and catalyst downstream of said screen section, and wherein said vertical outlet channels further contain further wall portions within said channels each said further wall portion bearing a screen section for withdrawing of reactor effluent from said catalyst.

BRIEF DESCRIPTION OF THE DRAWING

FIG. 2A is a schematic sectional view of the bottom part of an embodiment of a reactor according to the invention;

FIG. 2B is a view inside the bottom part of the reactor of FIG. 2A from above;

DESCRIPTION OF PREFERRED EMBODIMENTS

Figure 1:
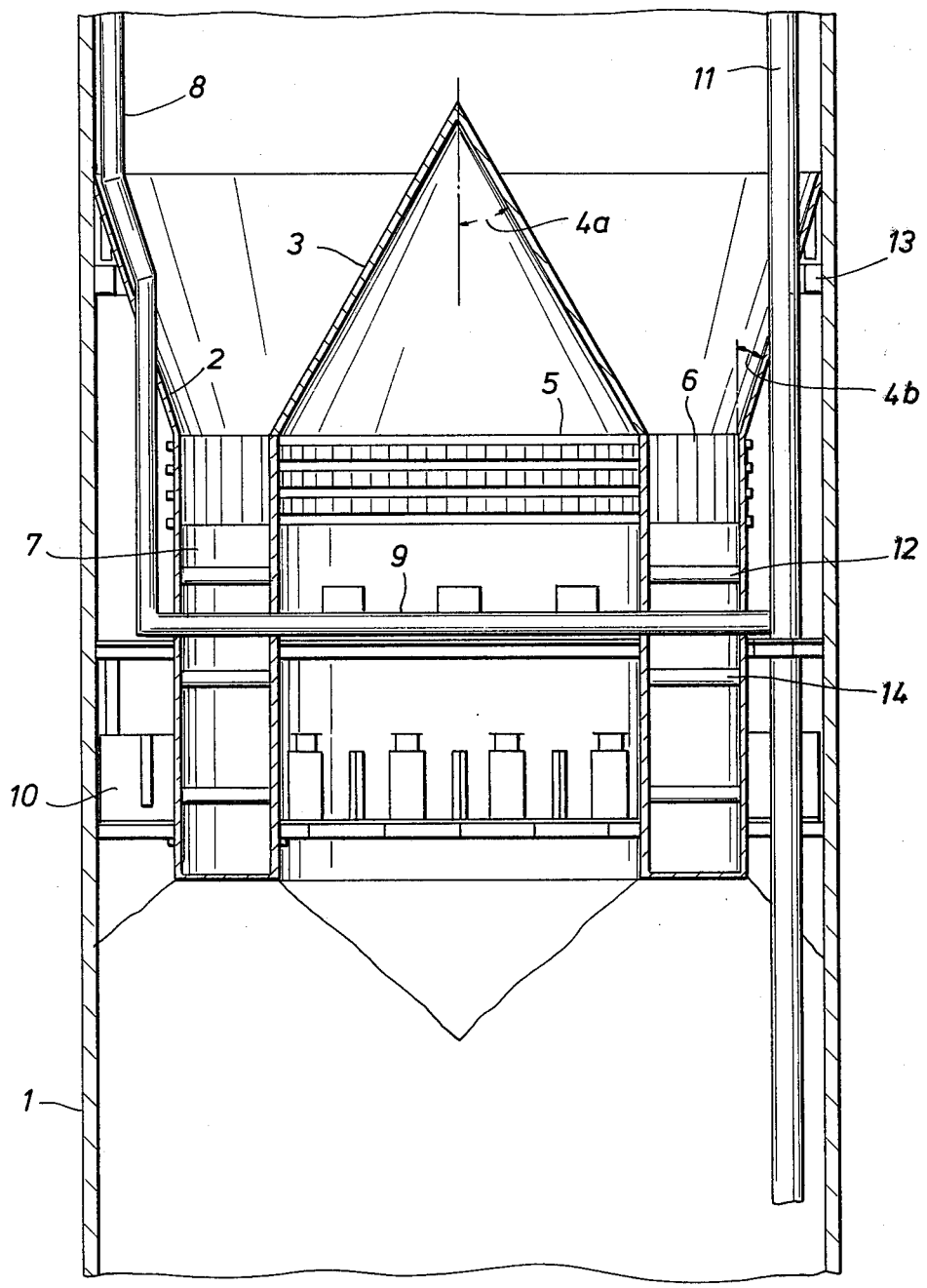
FIG. 1 is a schematic sectional view showing part of a reactor according to the invention.

The conical surfaces of the supporting means and their associated outlet channels are preferably ring shaped in cross-section, the inner walls of the channels bearing the further screen section. Further, and in particular in very large-sized reactors, a plurality of concentric ring shaped conical surfaces with associated channels may be provided, the inner and outer wall of each channel bearing a screen section.

As an alternative, either as a separate provision or in combination with the above solution at least one double walled hollow partition may be provided within the vertical outlet channel(s) each wall thereof bearing a screen section. Such a partition or each such partition may be circular and concentrical with the outer wall of the outlet channel(s). Alternatively, the, or each, partition may be straight and extend vertically from the outer wall of the outlet channel(s) to an opposite wall. In case more, and at least two, straight partitions are present, the partitions preferably are parallel and at equal distance from each other.

Further, according to the invention, a cooling fluid inlet conduit may be provided communicating with the/each combined catalyst and reactor effluent outlet channel below the perforated screen section.

In a preferred embodiment, the acute angle formed by a line (or lines) lying in the conical surface(s) and the axis of the reactor preferably is from 15°–45°. Finally the vertical outlet channels may include at least one inverted conical section connected at its top and at its bottom with a cylindrical or annular screen section. Alternatively, for constructional reasons, the cylindrical or annular section may also be of polygonal configuration.

It should be noted that there are different solutions in reactor designs suitable for solving scaling-up problems. An example thereof may be a parallel arrangement, as described in U.S. Pat. No. 3,186,935. It will be clear, however, that such an arrangement unavoidably will leave part of the cross sectional reactor area non-utilized, which is rather expensive for equipment of this size.

The invention will now further be illustrated with reference to the accompanying drawing wherein similar parts in the embodiments shown in the figures have been identified by the same reference numerals, while no reference numerals have been used for those parts not requiring further elucidation for a good understanding of the invention.

Referring now to the embodiment of FIG. 1 showing part of a reactor the reactor wall has been designated by 1. The reactor is cylindrical as usual and has been provided internally with supporting means consisting of an outer conical surface 2 and an inner conical surface 3, terminating at their lower end in a ring shaped channel 7 for the passage of catalyst and reactor effluent. In this example the angle 4a with the vertical axis of the conical inner surface is about 30° and the angle 4b with the outer surface is about 20°.

The channel 7 is provided with an inner screen 5 and an outer screen 6 for separating the reactor effluent, which passes through the screens, from the catalyst. A quench fluid supply pipe 8 leads from the top of the reactor to a quench fluid injection pipe 9 connected therewith. The reactor effluent is received by a liquid distributor tray 10 and similar internals as described above may be present further downstream of the reactor section shown. A thermobar 11 is present for the usual temperature measurement. The inner conical surface 3 and inner screens 5 and further associated parts are carried and supported by insert supports 12 and 14 and the outer internal supporting means by cone supports 13.

In FIGS. 2A and 2B a bottom part of reactor is shown, which may e.g., be the terminal downstream section of a reactor as shown in FIG. 1.

Similar parts as described in connection with FIG. 1 have been identified by the same reference numerals. The bottom part shown is provided with a lower cone segment 15 which is surrounded by an insulating layer 16. The bottom reactor head 17 composes a reactor effluent outlet nozzle 18 and a central catalyst withdrawal pipe 19 including a catalyst unloading nozzle 20. It should be noted that the various parts have been shown only schematically merely for mentioning their presence and not as a detailed mechanical construction thereof, this being no part of the present invention and not requiring a detailed description for a good understanding thereof.

By way of example a few cone angles have been indicated by 21a and 21b respectively, the angles in question in this embodiment being about 30°.

Figure 3:
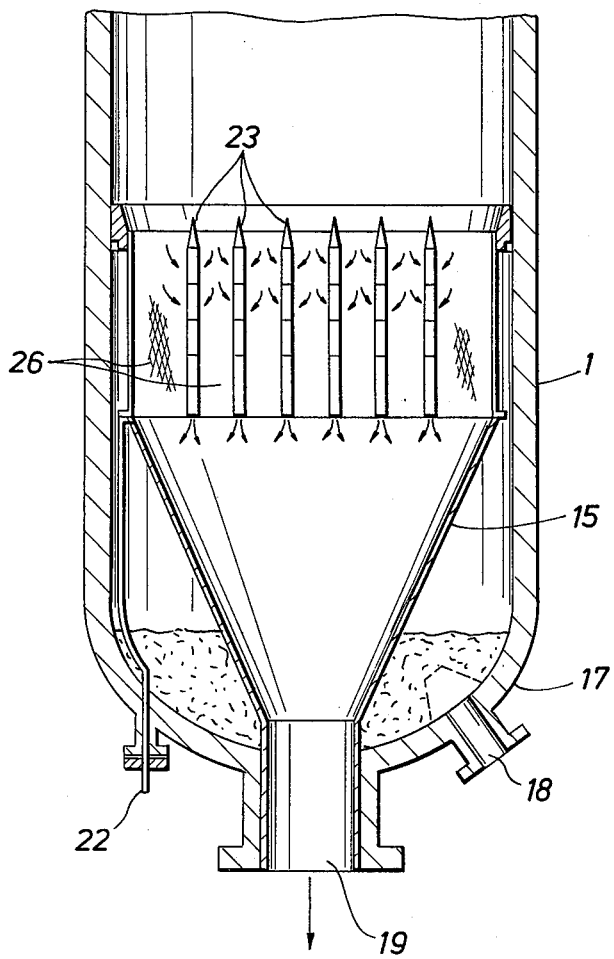
FIG. 3 is a schematic sectional view of the bottom part of another embodiment of a reactor according to the invention.

FIG. 3 represents an alternative embodiment of a reactor according to the invention, and shows, by way of example, the bottom part thereof comprising the lower part of the shell 1 and the bottom reactor head 17. The bottom head is provided with effluent outlet nozzle 18, catalyst withdrawal pipe 19 and further with a cooling fluid inlet 22.

The catalyst/reactor effluent separation section comprises a cylindrical part which is provided with a number of double walled vertical partitions 23 arranged at equal distances from each other. In this example the partitions are straight running from wall to wall in the cylindrical part. However, the partitions may alse be cylindrical in concentric arrangement. These partitions serve during operation as units for separating reactor effluent from the catalyst. Between the partitions a number of vertical channel sections 26 is left, which channel sections can be compared with the vertical channels 7 comprising the screen sections, as shown in the embodiments of FIGS. 1 and 2.

Figure 3A:
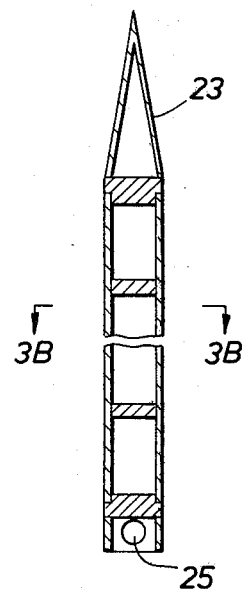
FIGS. 3A and 3B are sections of a partition wall as shown in FIG. 3 on an enlarged scale.
Figure 3B:
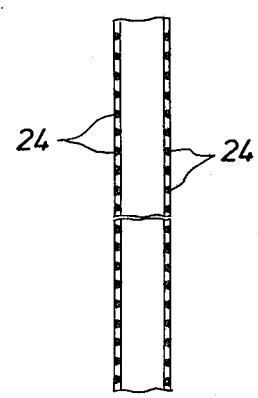

A partition 23 is shown on a larger scale in FIGS. 3A and 3B. In FIG. 3A such a partition in a similar vertical section as in FIG. 3 is represented, and comprises a cone shaped top portion, a number of vertical parallel bars leaving vertical slits between them, an inner space provided with distant pieces for receiving reactor effluent passing through the slits and an effluent withdrawal pipe 25 at the bottom. FIG. 3B is a section along the line 3B—3B of FIG. 3A showing the screen section 24 constituting the walls of the partition. The bars may be of a configuration as described in U.S. Pat. No. 3,966,420 with particular reference to FIG. 3 thereof.

It will be understood that the invention is not restricted to the embodiments described above by way of example. In practice the selection of which arrangement has to be used is dependent on the process requirements and particularly to the capacities wanted and the constructional consequences thereof. In this connection it should be noted that also combinations of the design features of the embodiments of on the one hand FIGS. 1 and 2 and the other hand FIG. 3 may be used either at choice in a particular sieve section or simultaneously, e.g., by providing extra intermediate partitions 23 of FIG. 3 in the sieve section of channel 7 in an embodiment of a set-up as shown in FIGS. 1 and/or 2.

What is claimed is:

1. A moving bed reactor apparatus through which solid catalyst particles forming a catalyst bed descend by the action of gravity, which apparatus comprises: (a)

a vertically disposed cylindrical vessel, (b) a reactant inlet conduit communicating with an upper portion of said vessel, (c) a catalyst inlet conduit communicating with an upper portion of said vessel, (d) catalyst supporting means for at least one catalyst bed, said catalyst supporting means being disposed within said vessel below said catalyst inlet conduit, said catalyst supporting means being supported upon the inner wall of said vessel of being at least partly in the shape of the conical surface of at least one truncated cone conveying downwardly to at least one vertical outlet channel, each said outlet channel having outer circumferential walls for the combined passage of catalyst and separation of reactor effluent, said circumferential walls having a screen section for withdrawing said reactor effluent from said catalyst; said outlet channel(s) having separate outlet conduits for reactor effluent and catalyst downstream of said screen section, and wherein said vertical outlet channels further contain inner wall portions within said channels, each said inner wall portion bearing a further screen section for withdrawing of reactor effluent from said catalyst.

2. A moving bed reactor apparatus according to claim 1 wherein said supporting means conical surfaces and their associated outlet channels are ring shaped in cross-section.

3. A moving bed reactor apparatus according to claim 2 having a plurality of concentric ring shaped supporting means conical surfaces with associated channels, the inner and outer wall of each channel bearing a screen section.

4. A moving bed reactor apparatus according to claim 1 having at least one double walled hollow partition within said vertical outlet channel(s) each wall thereof bearing a screen section.

5. A moving bed reactor apparatus according to claim 4 wherein said partition(s) is circular and concentrical with the outer wall of the outlet channel(s).

6. A moving bed reactor apparatus according to claim 4 wherein said partition is straight and extends vertically from the outer wall of the outlet channel(s) to an opposite wall.

7. A moving bed reactor apparatus according to claim 4 having at least two straight partitions, said partitions being parallel and at equal distance from each other.

8. A moving bed reactor apparatus according to claim 1 having in addition a cooling fluid inlet conduit communicating with the outlet channel below the screen section.

9. A moving bed reactor apparatus according to claim 1, wherein the acute angle formed by a descriptive line lying in the conical surface(s) and the axis of the vessel is from 15° to 45°.

10. A moving bed reactor apparatus as in claim 1 wherein the vertical outlet channels include at least one inverted conical section connected at its top and at its bottom with an annular screen section having a configuration selected from the group consisting of cylindrical, polygonal and annular configurations.

* * * * *

UNITED STATES PATENT AND TRADEMARK OFFICE
CERTIFICATE OF CORRECTION

PATENT NO. : 4,357,304
DATED : November 2, 1982
INVENTOR(S) : Abraham A. Pegels and Matheus M. Van Kessel It is certified that error appears in the above—identified patent and that said Letters Patent are hereby corrected as shown below:

Claim 1, line 10, after "vessel" change "of" to --and--.

Claim 1, line 11, after "cone" change "conveying" to --converging--.

Signed and Sealed this

First Day of February 1983

[SEAL]

Attest:

Attesting Officer

GERALD J. MOSSINGHOFF

Commissioner of Patents and Trademarks